United States Patent
Wang et al.

(10) Patent No.: US 8,049,592 B2
(45) Date of Patent: **\*Nov. 1, 2011**

(54) NETWORK-BASED LIGHTING EQUIPMENT REMOTE MONITORING AND MANAGEMENT SYSTEM

(75) Inventors: Yu-Huan Wang, Taipei (TW); Shu-Fen Lin, Taipei (TW); Shiue-Juan Liao, Taipei (TW); Chun-Hung Huang, Taipei (TW); Chien-Yuan Chen, Taipei (TW)

(73) Assignee: Chunghwa Telecom Co., Ltd., Taipei (TW)

( * ) Notice: Subject to any disclaimer, the term of this patent is extended or adjusted under 35 U.S.C. 154(b) by 1061 days.

This patent is subject to a terminal disclaimer.

(21) Appl. No.: 11/868,376

(22) Filed: Oct. 5, 2007

(65) Prior Publication Data

US 2009/0009282 A1 Jan. 8, 2009

(30) Foreign Application Priority Data

Jul. 6, 2007 (TW) .............................. 96124628 A

(51) Int. Cl.
| | |
|---|---|
| G05B 23/02 | (2006.01) |
| G05B 21/00 | (2006.01) |
| G05B 13/00 | (2006.01) |
| H04Q 5/22 | (2006.01) |
| G05D 23/00 | (2006.01) |
| A47J 39/00 | (2006.01) |
| B60H 1/00 | (2006.01) |

(52) U.S. Cl. ....... 340/3.1; 340/10.3; 340/10.1; 700/276; 700/277; 700/278; 165/201; 165/203

(58) Field of Classification Search .................. 700/276, 700/277, 278; 340/3.1, 10.3, 825.52; 165/201, 165/203

See application file for complete search history.

(56) References Cited

U.S. PATENT DOCUMENTS

| | | | | |
|---|---|---|---|---|
| 5,751,572 | A * | 5/1998 | Maciulewicz | 700/3 |
| 6,121,593 | A * | 9/2000 | Mansbery et al. | 219/679 |
| 6,297,724 | B1 * | 10/2001 | Bryans et al. | 340/3.51 |
| 7,047,092 | B2 * | 5/2006 | Wimsatt | 700/83 |
| 7,092,794 | B1 * | 8/2006 | Hill et al. | 700/276 |
| 7,133,748 | B2 * | 11/2006 | Robinson | 700/276 |
| 2002/0026528 | A1 * | 2/2002 | Lo | 709/245 |
| 2002/0035624 | A1 * | 3/2002 | Kim | 709/222 |
| 2009/0012650 | A1 * | 1/2009 | Wang et al. | 700/276 |

* cited by examiner

Primary Examiner — Brian Zimmerman
Assistant Examiner — Mirza Alam

(57) ABSTRACT

A network-based lighting equipment remote monitoring and management system is proposed, which is designed for use with a network system to allow the user to carry out monitoring and management tasks on one or more remotely-located lighting equipment systems in a real-time manner via the network system. The proposed system is characterized by the provision of a user-operated network-based real-time monitoring and management function for remotely-located lighting equipment, the capability to provide efficient and cost-effective management in the utilization of lighting equipment for saving energy and cost, and the capability to provide real-time warning of abnormal operating conditions of the lighting equipment.

9 Claims, 3 Drawing Sheets

NETWORK-BASED LIGHTING EQUIPMENT REMOTE MONITORING AND MANAGEMENT SYSTEM

BACKGROUND OF THE INVENTION

1. Field of the Invention

This invention relates to network-based remote monitoring technology, and more particularly, to a network-based lighting equipments remote monitoring and management system which allows the user to remotely monitor and perform management tasks on one or more sets of remotely-located lighting equipment systems in a real-time manner via a network system.

2. Description of Related Art

Lighting apparatuses are electricity-consuming devices that are widely installed in nearly all kinds of buildings, including office buildings, factories, hotels, restaurants, hospitals, supermarkets, warehouses, department stores, to name just a few. Types of commonly used lighting apparatuses include fluorescent lamps, incandescent lamps, halide lamps, to name a few. Fundamentally, lighting apparatuses are used to provide a light source that can illuminate a darkened space within a confined room so as to allow people staying in the room to have a bright environment to live or work therewithin.

In the management of a system of lighting apparatuses installed in a building, the management personnel usually need to monitor the operating status of the lighting equipment system during operation. For example, the management personnel need to inspect the ON/OFF state, electricity utilization conditions (load voltage, load current, and power consumption in watts), and whether the produced luminosity is adequate to provide good visibility. Moreover, the management personnel need to constantly check whether all the individual lighting units (bulbs, fluorescent tubes, etc.) in the lighting equipment system operate normally. If any lighting unit is flashing or burned out, the management personnel need to repair or replace the bad lighting unit. In addition, for energy saving purposes, the management personnel need to learn the total power consumption by the lighting equipment system during a certain period, so that it can be used as a reference for efficient and cost-effective management in the utilization of the lighting equipment system.

Traditionally, the above-mentioned lighting equipment management tasks are carried out by human labor, i.e., the inspection of the operating status of the lighting equipment is carried out through visual inspection by the management personnel, and the recording of operating characteristics data (i.e., load voltage, load current, and power consumption in watts) is carried out by visually inspecting electronic instruments and then handwriting on papers. When it is required to analyze these operating characteristics data to learn the energy consumption of the lighting equipment, the management personnel then need to perform calculations and analysis through handwork and paperwork.

One apparent drawback to the above-mentioned practice is that the paperwork and handwork is highly tedious, laborious, and time-consuming and therefore highly inefficient for the management personnel to implement. In addition, in the event of an abnormal operating condition of the lighting equipment, the management personnel usually cannot be informed of this condition promptly in real time, thus causing a delay to the maintenance/repair work.

SUMMARY OF THE INVENTION

It is therefore an objective of this invention to provide a network-based lighting equipment remote monitoring and management system which allows the management personnel to remotely monitor a remotely-located lighting equipment system in a real-time manner via a network system.

It is another objective of this invention to provide a network-based lighting equipment remote monitoring and management system which allows the management personnel to be informed of an abnormal operating condition in a remotely-located lighting equipment system promptly in a real-time manner so that any abnormally-operating lighting unit in the lighting equipment system can be repaired or replaced immediately without delay.

The network-based lighting equipment remote monitoring and management system according to the invention is based on a distributed architecture comprising: (A) a server-side unit; and (B) an equipment-side unit; wherein the server-side unit is installed on one or more servers and whose internal architecture includes: (A0) a remote network communication module; (A1) a user interface module; and (A2) an operation data storage module; and can further optionally include: (A3) a prescheduled operation data analyzing module; and wherein the equipment-side unit is integrated to each lighting apparatus and whose internal architecture includes: (B0) a network linking module; (B1) an equipment-side server module; and (B2) an operating-status monitoring module which is composed of an operation inspection mechanism and an operation control mechanism.

The network-based lighting equipment remote monitoring and management system according to the invention has the following features: (1) the provision of a network-based real-time monitoring and management function for user-operated monitoring and management of remotely-located lighting equipment systems through a GUI-based user interface displayed on the client workstation, allowing management personnel to be remotely informed of all operating status of the lighting equipment systems, to remotely set desired operating conditions, and to achieve optimal utilization of the lighting equipment systems; (2) the capability to provide efficient and cost-effective management on the lighting equipment systems for saving energy and cost; and (3) the capability to provide real-time warning of abnormal operating conditions of the lighting equipment systems, allowing the management personnel to maintain usable operability of the lighting equipment systems.

BRIEF DESCRIPTION OF DRAWINGS

The invention can be more fully understood by reading the following detailed description of the preferred embodiments, with reference made to the accompanying drawings, wherein.

DETAILED DESCRIPTION OF PREFERRED EMBODIMENTS

The network-based lighting equipment remote monitoring and management system according to the invention is disclosed in full details by way of preferred embodiments in the following with reference to the accompanying drawings.

Figure 1:
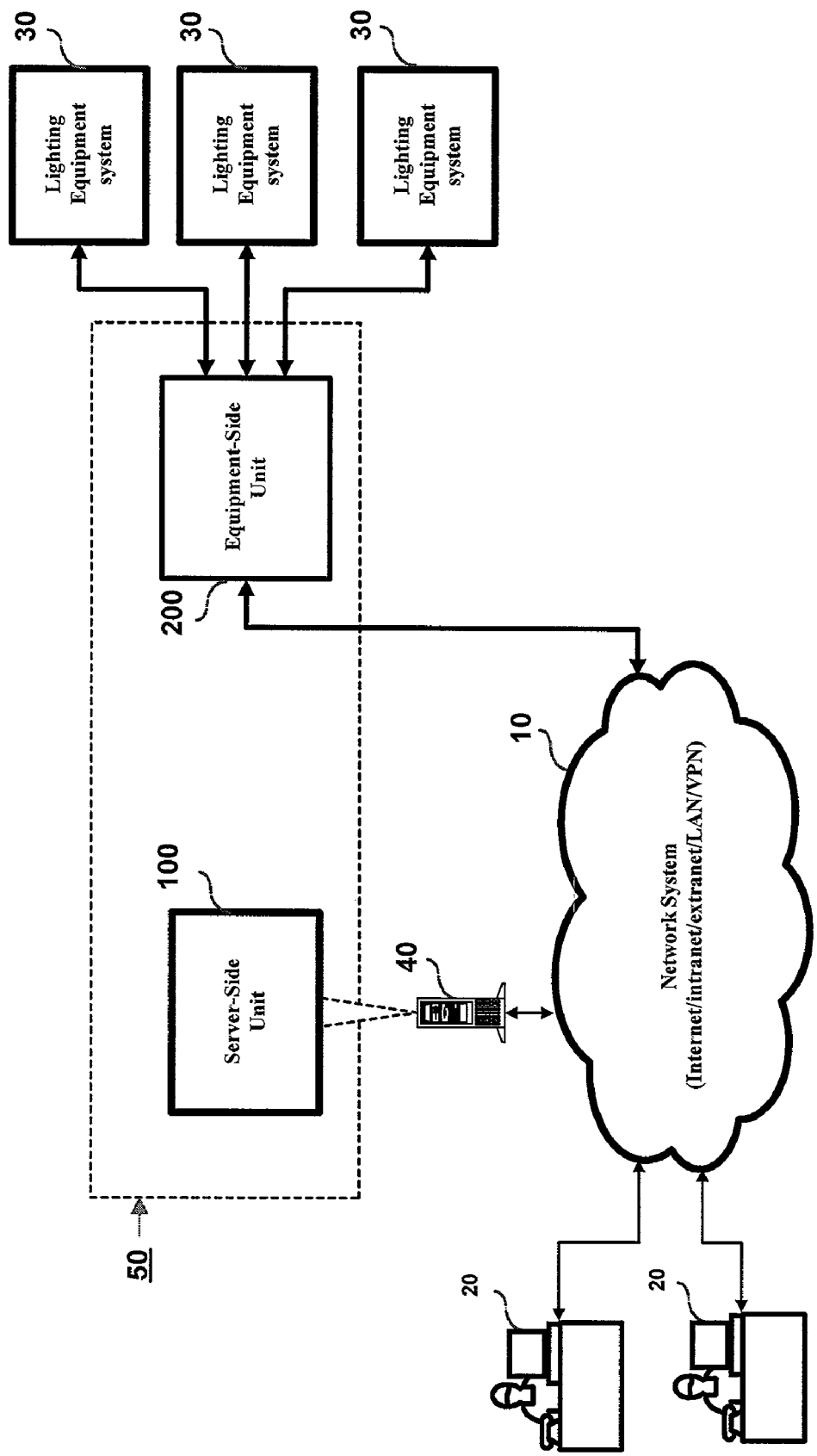
FIG. 1 is a schematic diagram showing the application and distributed architecture of the network-based lighting equipment remote monitoring and management system of the invention with a network system.
Figure 2A:
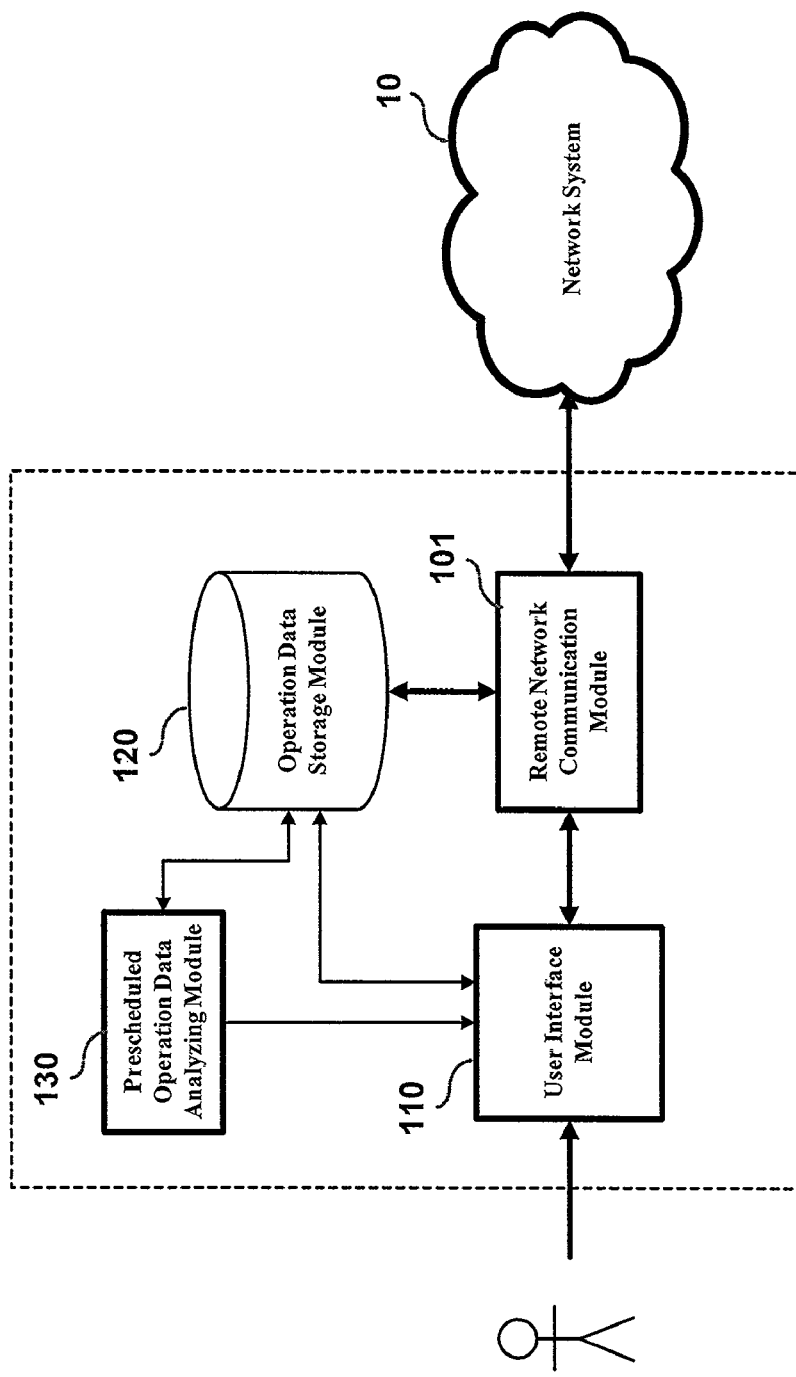
FIG. 2A is a schematic diagram showing the internal architecture of the server-side unit utilized by the network-based lighting equipment remote monitoring and management system of the invention.
Figure 2B:
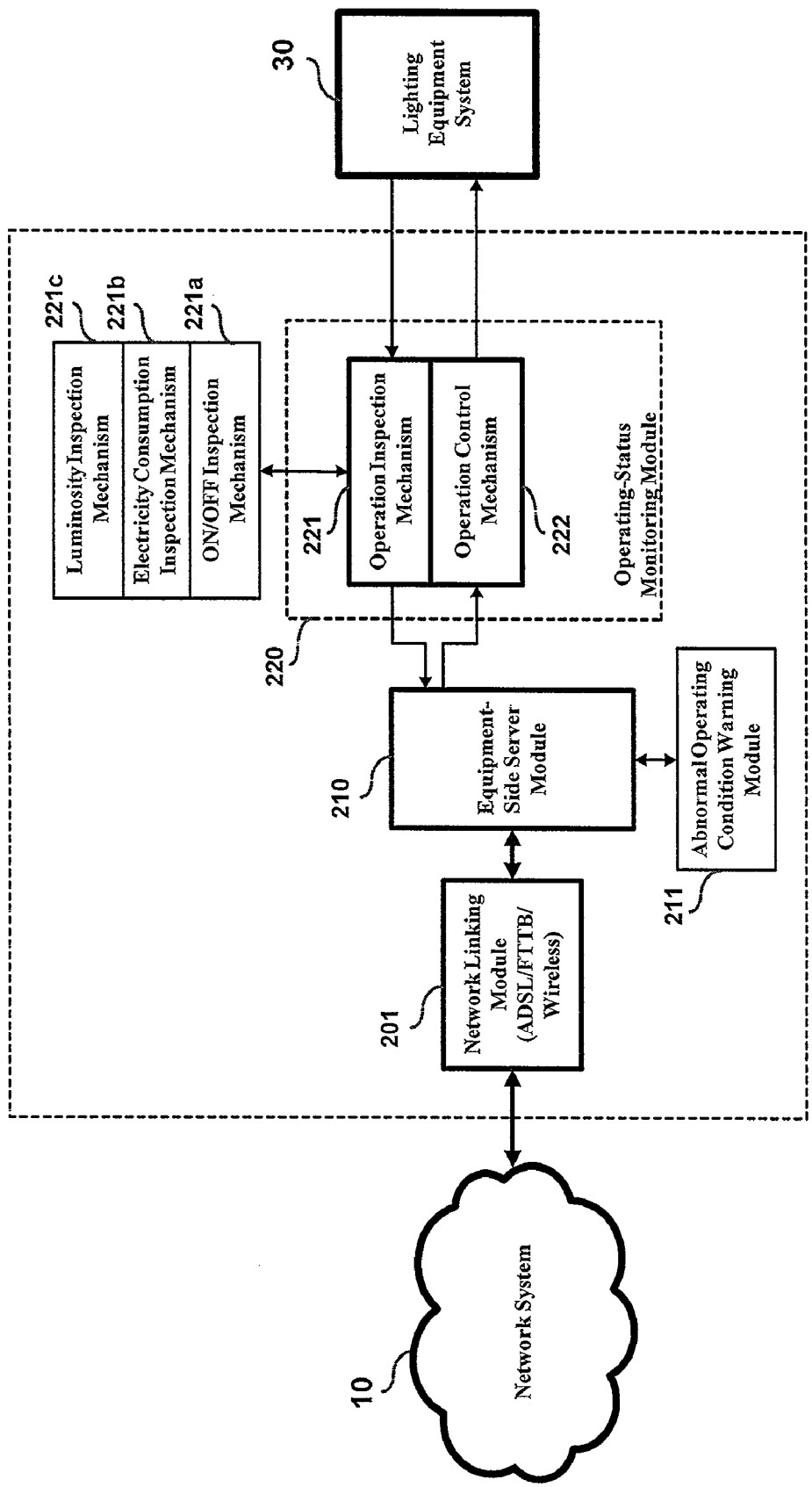
FIG. 2B is a schematic diagram showing the internal architecture of the equipment-side unit utilized by the network-based lighting equipment remote monitoring and management system of the invention.

FIG. 1 is a schematic diagram showing the application and distributed architecture of the network-based lighting equipment remote monitoring and management system according to the invention (as the part enclosed in the dotted box indicated by the reference numeral 50). As shown, the network-based lighting equipment remote monitoring and management system of the invention 50 is designed for use in conjunction with a network system 10, such as the Internet, an intranet system, an extranet system, a wired-type LAN (Local Area Network) system, a wireless-type LAN system, or a VPN (Virtual Private Network) system, and which is capable of allowing one or more users (i.e., management personnel) to remotely monitor and perform management tasks on one or more sets of remotely-located lighting equipment systems 30 in a real-time manner via the network system 10 (in the embodiment of FIG. 1, only 3 sets of lighting equipment systems 30 are shown for demonstrative purpose; but in practice, the number of lighting equipment systems that can be remotely monitored by the invention is unrestricted). In practice, for example the lighting equipment systems 30 can be each a system of lighting units including fluorescent lamps, incandescent lamps, halide lamps, or other types of lighting devices.

As shown in FIG. 1, the network-based lighting equipment remote monitoring and management system of the invention 50 is based on a distributed architecture comprising two separate entities: (A) a server-side unit 100; and (B) an equipment-side unit 200; wherein as shown in FIG. 32A the server-side unit 100 is installed on one or more servers 40 and whose internal architecture includes: (A0) a remote network communication module 101; (A1) a user interface module 110; and (A2) an operation data storage module 120; and can further optionally include a prescheduled operation data analyzing module 130; and wherein the equipment-side unit 200 is integrated to each set of lighting equipment system 30 and whose internal architecture includes: (B0) a network linking module 201; (B1) an equipment-side server module 210; and (B2) an operating-status monitoring module 220 including an operation inspection mechanism 221 and an operation control mechanism 222. In practical implementation, for example, the server-side unit 100 can be entirely implemented with a computer software program for installation to the server 40, while all of the network linking module 201, the equipment-side server module 210, and the operating-status monitoring module 220) are all hardware modules.

Firstly, the respective attributes and behaviors of the constituent modules of the server-side unit 100 are described in details in the following.

The remote network communication module 101 is used to allow the server-side unit 100 to communicate with the equipment-side unit 200 via the network system 10, capable of receiving the data of operating characteristics of each lighting equipment system 30 that are uploaded from the equipment-side unit 200 via the network system 10 to the server-side unit 100, and also capable of downloading each user-specified lighting control command from the server-side unit 100 to the equipment-side unit 200 via the network system 10.

The user interface module 110 is used to provide a user interface, such as a GUI (Graphic User Interface) based user interface, to each client workstation 20 being linked to the server 40 for the purpose of allowing the user (i.e., management personnel) at the client workstation 20 to operate the network-based lighting equipment remote monitoring and management system of the invention 50. When linked to the client workstation 20, the user interface module 110 is capable of providing a lighting-equipment operating-status displaying function and a human-operated control command issuing function to the client workstation 20. The lighting-equipment operating-status displaying function is used to display a set of operating characteristics data indicative of the operating status of each remotely-located lighting equipment system 30 as well as a set of related product and management information about each lighting equipment system 30; where the operating characteristics data includes, for example, current ON/OFF state, current luminosity setting, and electricity consumption conditions (load voltage, load current, and power consumption in watts); and the related product and management information includes, for example, name of manufacturer, serial number, product specification, name of purchaser, date of purchase, warranty period, installation site, name of supervisory personnel, and maintenance/repair record, to name a few. The human-operated control command issuing function is capable of providing a set of lighting control commands in relation to the operation of each lighting equipment system 30 for user selection. When the user selects a lighting control command, the user interface module 110 will send the user-selected command via the network system 10 to the equipment-side unit 200 for control of the designated lighting equipment system 30. The command set includes, for example, an ON/OFF switch command and a luminosity setting command.

The operation data storage module 120 is a database module used for storage of the operating characteristics data (i.e., ON/OFF state, luminosity setting, and electricity consumption conditions) of each remotely-located lighting equipment system 30. These data can be displayed through the user interface module 110 on the client workstation 20 for the user to browse. In addition, this operation data storage module 120 is also used for storage of related product and management information about each remotely-located lighting equipment system 30, including, for example, name of manufacturer, serial number, product specification, name of purchaser, date of purchase, warranty period, installation site, name of supervisory personnel, and maintenance/repair record.

The prescheduled operation data analyzing module 130 is capable of generating an electricity consumption analysis report in the form of an electronic document based on the operating characteristics data of each lighting equipment system 30 that have been acquired during a predefined period, such as every three months. The electricity consumption analysis report is used to indicate the total power consumption in watts of each of the lighting equipment systems 30 and the date and time when the lighting equipment system 30 were turned on. The management personnel can browse or print a copy of the electricity consumption analysis report by operating the user interface module 110 on the client workstation 20. The contents of this electricity consumption analysis report can be used by the management personnel as a reference for efficient and cost-effective management in the utilization of the lighting equipment systems 30.

Next, the respective attributes and behaviors of the constituent modules of the equipment-side unit 200 are described in details in the following.

The network linking module 201 is used to link the equipment-side unit 200 to the network system 10. In practice, the network linking module 201 can be either an ADSL (Asynchronous Digital Subscriber Line) type, an FTTB (Fiber To The Building) type, or a wireless type of network linking device, and which is used to allow the equipment-side unit 200 to exchange data with the server-side unit 100 via the network system 10.

The equipment-side server module 210 is linked to the network linking module 201, and which is used to collect the data of operating characteristics of each lighting equipment system 30 that are detected by the operation inspection mechanism 221, and further capable of transferring the collected data via the network system 10 to the server-side unit 100. Further, the equipment-side server module 210 is capable of forwarding each received lighting control command from the server-side unit 100 to the associated operation control mechanism 222 of the command-specified lighting equipment system 30. In the embodiment of FIG. 1, for example, the network linking module 201 is shown to be connected to only one unit of equipment-side server module 210; but the number of units that can be connected to the network linking module 201 is unrestricted and dependent on the linking capacity (i.e., number of connecting ports) of the network linking module 201. Moreover, the equipment-side server module 210 further includes an abnormal operating condition warning module 211 which is capable of generating a warning message in response to an event that the operation inspection mechanism 221 detects an abnormal operating condition of the lighting equipment system 30. The warning message is transferred via the network system 10 to the server-side unit 100 so that the management personnel can be informed of this abnormal operating condition via the client workstation 20 and carry out necessary maintenance/repair tasks on the failed lighting equipment system 30. In practice, for example, the abnormal operating condition warning module 211 can be implemented in such a manner that after the server-side unit 100 issues a lighting control command to the lighting equipment system 30, the operation inspection mechanism 221 will be activated to monitor if the lighting equipment system 30 operates in a manner specified by the lighting control command; if NOT, the abnormal operating condition warning module 211 will promptly issues the warning message. For example, it is assumed that the lighting equipment system 30 provides 5 controllable levels of luminosity, where the first level represents the lowest level of luminosity while the fifth level represents the highest; and it is assumed that the management personnel wants to set the lighting equipment system 30 to give light at the third level of luminosity. In this case, the management personnel can activate the user interface module 110 to issue a corresponding lighting control command via the network system 10 to the lighting equipment system 30. When the lighting equipment system 30 is lighted on, the operation inspection mechanism 221 will monitor the lighting equipment system 30 to inspect whether the produced luminosity by the lighting equipment system 30 is at the third level; if NOT (for example the produced luminosity is only at the second level), the abnormal operating condition warning module 211 will promptly issue a warning message via the network system 10 to the client workstation 20 for informing the management personnel to carry out necessary maintenance/repair tasks on the failed lighting equipment system 30.

The operating-status monitoring module 220 includes an operation inspection mechanism 221 and an operation control mechanism 222. The operation inspection mechanism 221 is capable of inspecting the operating status of each lighting equipment system 30 during operation to obtain the operating characteristics thereof, and further capable of sending the detected operating characteristics data to the equipment-side server module 210 for transfer via the network system 10 to the server-side unit 100. In practical implementation, for example, the operation inspection mechanism 221 includes an ON/OFF inspection mechanism 221a, an electricity consumption inspection mechanism 221b, and a luminosity inspection mechanism 221c. The ON/OFF inspection mechanism 221a is used to inspect the ON/OFF state of each lighting equipment system 30. The electricity consumption inspection mechanism 221b is used to inspect the current electricity consumption conditions (i.e., load voltage, load current, and power consumption in watts) of each lighting equipment system 30. The luminosity inspection mechanism 221c is used to inspect the produced luminosity of each lighting equipment system 30.

The operation control mechanism 222 is capable of controlling each lighting equipment system 30 to operate in a user-specified manner based on lighting control commands that are downloaded from the server-side unit 100 via the network system 10. For example, each lighting equipment system 30 can be remotely controlled by the management personnel to operate in a user-specified manner. The user-controllable operating states include, for example, ON/OFF state and luminosity level.

The following is a detailed description of a practical application example of the network-based lighting equipment remote monitoring and management system of the invention 50 during actual operation.

In actual application, the management personnel can operate the network-based lighting equipment remote monitoring and management system of the invention 50 for remote monitoring and management of the lighting equipment systems 30 by first linking his/her client workstation 20 via the network system 10 to the server 40. When linked, the management personnel can turn ON or OFF the remotely-located lighting equipment systems 30 through the user interface module 110 and set a desired luminosity level for each turned-on lighting equipment system 30. The user interface module 110 will respond to each user-initiated control action by issuing a corresponding lighting control command and then activating the remote network communication module 101 to transfer the command via the network system 10 to the equipment-side unit 200.

When the network linking module 201 receives the lighting control command via the network system 10 from the server-side unit 100, it transfers the received command to the equipment-side server module 210 where the received command is decoded into a corresponding control signal and then transferred to the operation control mechanism 222 for the operation control mechanism 222 to control the lighting equipment system 30 to be turned ON or set to a user-specified level of luminosity.

When the lighting equipment system 30 is turned ON, the operation inspection mechanism 221 is activated to inspect the lighting equipment system 30 for its operating characteristics, and then send the detected data to the equipment-side server module 210 for transfer via the network system 10 to the server-side unit 100. The detected operating characteristics include, for example, load voltage, load current, power consumption in watts, produced luminosity, and the brightness level of the environment illuminated by the lighting equipment systems 30.

When the server-side unit 100 receives the operating characteristics data, it stores these data into the operation data storage module 120. The management personnel can then browse these data through the user interface module 110 on the client workstation 20 to learn the current operating status of each lighting equipment system 30.

In the event that an abnormal operating condition occurs to any one of the lighting equipment systems 30, the equipment-side server module 210 will respond by issuing a warning message to the server-side unit 100 for display on the client workstation 20 to notify the management personnel to take necessary maintenance/repair task on the failed lighting equipment system 30. This warning function can be implemented in such a manner that the operation inspection mechanism 221 detects the actual operating status of each lighting equipment system 30 during operation, and the detected status data is then compared by the abnormal operating condition warning module 211 against the user-specified value to check if the two values are equal; if NOT, the warning message is issued. For example, it is assumed that the lighting equipment system 30 provides 5 controllable levels of luminosity, where the first level represents the lowest level of luminosity while the fifth level represents the highest; and it is assumed that the management personnel wants to set the lighting equipment system 30 to give light at the third level of luminosity, then the management personnel can activate the user interface module 110 to issue a corresponding lighting control command via the network system 10 to the lighting equipment system 30. When the lighting equipment system 30 is lighted on, the operation inspection mechanism 221 will monitor the lighting equipment system 30 to inspect whether the luminosity of the produced light is at the third level; if NOT (for example the produced luminosity is only at the second level), the abnormal operating condition warning module 211 will promptly issue a warning message via the network system 10 to the client workstation 20 for the purpose of informing the management personnel to carry out necessary maintenance/repair tasks.

After the lighting equipment systems 30 have been operated for a predefined period, for example 3 months, the pre-scheduled operation data analyzing module 130 is automatically activated to generate an electricity consumption analysis report in the form of an electronic document based on the operating characteristics data of each lighting equipment system 30 stored in the operation data storage module 120. The electricity consumption analysis report is used to indicate, for example, the total power consumption in watts of each lighting equipment system 30 during each period of three months. The management personnel can browse or print a copy of the electricity consumption analysis report by operating the user interface module 110 on the client workstation 20. The contents of this electricity consumption analysis report can be used by the management personnel as a reference for efficient and cost-effective management in the utilization of the lighting equipment systems 30.

In conclusion, the invention provides a network-based lighting equipment remote monitoring and management system which has the following features: (1) the provision of a network-based real-time monitoring and management function for user-operated monitoring and management of remotely-located lighting equipment systems through a GUI-based user interface displayed on the client workstation, allowing management personnel to be remotely informed of all operating status of the lighting equipment systems, to remotely set desired operating conditions, and to achieve optimal utilization of the lighting equipment systems; (2) the capability to provide efficient and cost-effective management on the lighting equipment systems for saving energy and cost; and (3) the capability to provide real-time warning of abnormal operating conditions of the lighting equipment systems, allowing the management personnel to maintain usable operability of the lighting equipment systems. The invention is therefore more advantageous to use than the prior art.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A network-based lighting equipment remote monitoring and management system for use to integrate to a network system for providing a user-operated monitoring and management function on at least one set of remotely-located lighting equipment system;

the network-based lighting equipment remote monitoring and management system being based on a distributed architecture comprising a server-side unit and an equipment-side unit; wherein the server-side unit is integrated to a server linked to the network system and is capable of allowing a client workstation to be linked via the network system to the server for user-operated monitoring and management tasks on the lighting equipment system, and which includes:

a remote network communication module, which is used to allow the server-side unit to communicate with the equipment-side unit via the network system;

a user interface module, which is capable of providing a user interface to the client workstation being linked to the server, and capable of providing a lighting-equipment operating-status displaying function and a human-operated control command issuing function; wherein the lighting-equipment operating-status displaying function is capable of displaying a set of operating status data about the lighting equipment system, while the human-operated control command issuing function is capable of providing a set of lighting control commands for user selection and issuing each user-selected lighting control command via the network system to the lighting equipment system; and an operation data storage module, which is used for storage of a set of operation data about the lighting equipment system downloaded from the equipment-side unit and capable of displaying the operation data on the client workstation through the user interface module; and wherein:

the equipment-side unit is integrated to the lighting equipment system and linked to the network system, and which includes:

a network linking module, which is capable of linking the equipment-side unit to the network system;

an equipment-side server module, which is linked to the network linking module and capable of providing a two-way data communication function between the lighting equipment system and the server-side unit; and an operating-status monitoring module, which includes an operation inspection mechanism and an operation control mechanism; wherein the operation inspection mechanism is capable of inspecting the operating status of the lighting equipment system during operation to acquire a set of operating characteristics data thereof, and further capable of sending the detected operating characteristics data to the equipment-side server module for transfer to the server-side unit via the network system; while the operation control mechanism is capable of controlling the lighting equipment system to operate in a user-specified manner based on each lighting control command downloaded from the server-side unit via the network system.

2. The network-based lighting equipment remote monitoring and management system of claim 1, wherein the network system is Internet, an intranet system, an extranet system, a wired-type LAN (Local Area Network) system, a wireless-type LAN system, or a VPN (Virtual Private Network) system.

3. The network-based lighting equipment remote monitoring and management system of claim 1, wherein the equipment-side server module in the equipment-side unit further includes:
   an abnormal operating condition warning module, which is capable of generating a warning message for transfer via the network system to the client workstation in the event that the operation inspection mechanism detects an abnormal operating condition in the lighting equipment system.

4. The network-based lighting equipment remote monitoring and management system of claim 1, wherein the server-side unit further includes:
   a prescheduled operation data analyzing module, which is capable of generating an electricity consumption analysis report in the form of an electronic document based on the operating characteristics data of each lighting equipment system during a predefined period.

5. The network-based lighting equipment remote monitoring and management system of claim 1, wherein the network linking module is an ADSL (Asynchronous Digital Subscriber Line) type of network linking device.

6. The network-based lighting equipment remote monitoring and management system of claim 1, wherein the network linking module is an FTTB (Fiber To The Building) type of network linking device.

7. The network-based lighting equipment remote monitoring and management system of claim 1, wherein the network linking module is a wireless type of network linking device.

8. The network-based lighting equipment remote monitoring and management system of claim 1, wherein the operation data storage module is further used for storage of related product and management information about the lighting equipment system.

9. The network-based lighting equipment remote monitoring and management system of claim 1, wherein the operation inspection mechanism includes:
   an ON/OFF inspection mechanism, which is capable of inspecting the ON/OFF state of the lighting equipment system;
   an electricity consumption inspection mechanism, which is capable of inspecting the electricity consumption conditions of the lighting equipment system; and
   a luminosity inspection mechanism, which is capable of inspecting the luminosity of light produced by the lighting equipment system.

* * * * *